US011838594B2

(12) United States Patent
Bai et al.

(10) Patent No.: US 11,838,594 B2
(45) Date of Patent: Dec. 5, 2023

(54) MEDIA RESOURCE PLAYING AND TEXT RENDERING METHOD, APPARATUS AND DEVICE AND STORAGE MEDIUM (71) Applicant: ZTE Corporation, Shenzhen (CN)

(72) Inventors: Yaxian Bai, Guangdong (CN); Cheng Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/771,417

(22) PCT Filed: Nov. 12, 2020

(86) PCT No.: PCT/CN2020/128276
§ 371 (c)(1),
(2) Date: Apr. 22, 2022

(87) PCT Pub. No.: WO2021/109822
PCT Pub. Date: Jun. 10, 2021

(65) Prior Publication Data
US 2022/0368991 A1 Nov. 17, 2022

(30) Foreign Application Priority Data
Dec. 3, 2019 (CN) .......................... 201911223329.3

(51) Int. Cl.
H04N 21/4728 (2011.01)
H04N 21/488 (2011.01)
H04N 21/81 (2011.01)

(52) U.S. Cl.
CPC ..... H04N 21/4728 (2013.01); H04N 21/4886 (2013.01); H04N 21/816 (2013.01)

(58) Field of Classification Search
CPC ........... H04N 21/4728; H04N 21/4886; H04N 21/816
See application file for complete search history.

(56) References Cited

U.S. PATENT DOCUMENTS 10,819,907 B2 * 10/2020 Wang .................. H04N 21/816
11,503,314 B2 * 11/2022 Cooper ............... H04N 19/182
(Continued)

FOREIGN PATENT DOCUMENTS

CN 106233745 A 12/2016
CN 107211159 A 6/2017
(Continued)

OTHER PUBLICATIONS

International Search Report and Written Opinion for International Application No. PCT/CN2020/128276, dated Feb. 10, 2021.
(Continued)

Primary Examiner — Mulugeta Mengesha
(74) Attorney, Agent, or Firm — Wolf, Greenfield & Sacks, P.C.

(57) ABSTRACT

A media resource playing method and apparatus, a text rendering method and apparatus, a device, and a non-transitory computer-readable storage medium are disclosed. The method may include: determining, based on a first box type or a first sample group type, a region of interest in an omnidirectional video and at least one media resource correlated with the region of interest; and plying the at least one media resource correlated with the region of interest.

14 Claims, 5 Drawing Sheets

(56) References Cited

U.S. PATENT DOCUMENTS

| | | |
|---|---|---|
| 2016/0093105 A1 | 3/2016 | Rimon et al. |
| 2016/0165309 A1 | 6/2016 | Brandenburg et al. |
| 2018/0061002 A1 | 3/2018 | Lee et al. |
| 2018/0077210 A1 | 3/2018 | Hannuksela et al. |
| 2018/0160123 A1* | 6/2018 | Van Der Auwera .................... H04N 19/167 |
| 2018/0288396 A1 | 10/2018 | Bouazizi et al. |
| 2018/0332265 A1 | 11/2018 | Hwang et al. |
| 2019/0306530 A1* | 10/2019 | Fan .................... H04N 21/2362 |
| 2019/0364261 A1 | 11/2019 | Hwang et al. |
| 2021/0219013 A1* | 7/2021 | Deshpande ........ H04N 21/4312 |

FOREIGN PATENT DOCUMENTS

| | | |
|---|---|---|
| CN | 108702528 A | 10/2018 |
| CN | 110024400 A | 7/2019 |
| CN | 110351492 A | 10/2019 |
| CN | 110463195 A | 11/2019 |
| JP | 2019-525675 A | 9/2019 |
| JP | 2019-526994 A | 9/2019 |
| WO | WO 2015/106882 A1 | 7/2015 |
| WO | WO 2018/106548 A1 | 6/2018 |
| WO | WO 2018/182321 A1 | 10/2018 |

OTHER PUBLICATIONS

Examination Report for Indian Patent Application No. 202227025448, dated Sep. 22, 2022.

Office Action for Japanese Application No. 2022-523231, dated May 2, 2023.

Office Action for Korean Application No. 10-2022-7014038, dated Jun. 20, 2023.

Search Report for Japanese Application No. 2022-523231, dated Apr. 20, 2023.

Hannuksela et al., An Overview of the OMAF Standard for 360 Video. IEEE 2019 Data Compression Conference (DCC). Mar. 26, 2019, pp. 418-427. URL: https://ieeexplore.ieee.org/stamp.jsp?tp=&arnumber=8712670.

* cited by examiner

MEDIA RESOURCE PLAYING AND TEXT RENDERING METHOD, APPARATUS AND DEVICE AND STORAGE MEDIUM

CROSS-REFERENCE TO RELATED APPLICATION

This application is a national stage filing under 35 U.S.C. § 371 of international application number PCT/CN2020/128276, filed on Nov. 12, 2020, which claims priority to Chinese patent application No. 201911223329.3 filed on Dec. 3, 2019. The contents of these applications are incorporated herein by reference in their entirety.

TECHNICAL FIELD

The present disclosure relates to the field of immersive media technologies, for example, relates to a media resource playing method and apparatus, a text rendering method and apparatus, a device, and a non-transitory computer-readable storage medium.

BACKGROUND

Panoramic videos, also known as 360-degree panoramic videos or immersive videos, covering a horizontally 360-degree and vertically 180-degree field of view, are typically obtained by stitching videos shot with multiple cameras in different directions. An integration of three-dimensional dynamic panoramic videos and physical behavior of users can greatly enhance the viewing and perceptions of the users, providing them with a virtual world experience. This technology is also called Virtual Reality (VR).

When a user experiences a VR scene, as the user controls the viewport freely by himself/herself, the user cannot pay attention to every detail in the whole 360-degree scene in a viewing process, and thus inevitably misses highlights in some specified directions. For providing region of interest (ROI)-related indications, a client side needs related ROI description information, which lacks a unified expression.

SUMMARY

The present disclosure provides a media resource playing method and apparatus, a text rendering method and apparatus, a device, and a non-transitory computer-readable storage medium.

An embodiment of the present disclosure provides a media resource playing method, which may include: determining, based on a first box type or a first sample group type, a region of interest in an omnidirectional video and at least one media resource correlated with the region of interest; and playing the at least one media resource correlated with the region of interest.

An embodiment of the present disclosure provides a timed text rendering method, which may include: determining a region of interest in an omnidirectional video correlated with at least one text region of a timed text, and rendering depth information of the at least one text region of the timed text; and rendering the at least one text region of the timed text relative to the region of interest in the omnidirectional video.

An embodiment of the present disclosure provides a media resource playing apparatus, which may include: a region and resource determining module configured to determine, based on a first box type or a first sample group type, a region of interest in an omnidirectional video and at least one media resource correlated with the region of interest; and a media resource playing module configured to play the at least one media resource correlated with the region of interest.

An embodiment of the present disclosure provides a timed text rendering apparatus, which may include: a region and depth information determining module configured to determine a region of interest in an omnidirectional video correlated with at least one text region of a timed text, and render depth information of the at least one text region of the timed text; and a timed text rendering module configured to render the at least one text region of the timed text relative to the region of interest in the omnidirectional video.

An embodiment of the present disclosure provides a device, which may include: at least one processor; and a memory configured to store at least one program which, when executed by the at least one processor, causes the at least one processor to implement any of the methods according to the embodiments of the present disclosure.

An embodiment of the present disclosure provides a non-transitory computer-readable storage medium storing a computer program which, when executed by a processor, causes the processor to implement any one of the methods in the embodiments of the present disclosure.

The above embodiments and other aspects and the implementations thereof in the present disclosure are further described in the brief description of drawings, detailed description, and appended claims.

DETAILED DESCRIPTION

The embodiments of the present disclosure will be described below with reference to the accompanying drawings. The steps shown in the flowcharts of the drawings may be performed in a computer system, such as with a set of computer-executable instructions. Moreover, although a logical order is shown in the flowcharts, the steps shown or described may be performed, in some cases, in a different order from that shown or described herein.

The most unique feature of the VR technology is 360-degree surround scenes. However, due to a limited field of view, a person cannot enjoy a panorama in one viewing angle at one moment but focuses on specific regions. ROI is one of the regions in VR video content. ROI can be pre-defined, for example, through a director-recommended perspective, or a large amount of user behavior analysis, to obtain the best viewing direction, exciting regions, exciting clips and the like. ROI is strongly related to media content, being an attribute of the video. A user's viewport at a current moment is a field of view area jointly determined by the user's viewing direction and parameters defined for a terminal device, which is also a part of VR video content, but a location of a viewport area changes with the user's action. Attributes of the ROI and the viewport are independent of each other. However, when the user experiences a VR scene, due to his/her independent control of the viewport, the user cannot pay attention to every detail in the 360-degree scenes in a viewing process, and thus inevitably misses highlights in some specified directions. For providing ROI-related indications, a client side needs related ROI description information, which lacks a unified expression. In the MPEG-I Part 2: Omnidirectional Media Format (OMAF) developed by the ISO/the First Joint Technology Council of International Electrotechnical Commission (IEC JTC1)/the Twenty-ninth Sub-technical Committee (SC29)/the Eleventh Work Group (WG11), the Moving Picture Experts Group (MPEG), no ROI-related signaling is described. There is no effective solution to this problem.

An implementation of the embodiments of present disclosure is to store spatial location information of a region of interest in a panoramic video into a media file in the base media file format standardized in the International Organization for Standardization (ISO). The base media file format may refer to MPEG-4 Part 12 ISO Base Media File Format formulated by the ISO/IEC JTC1/SC29/WG11 MPEG. Projection, encapsulation steps and basic format of the omnidirectional video can refer to MPEG-I Part 2 OMAF formulated by ISO/IEC JTC1/SC29/WG11 MPEG.

Figure 1:
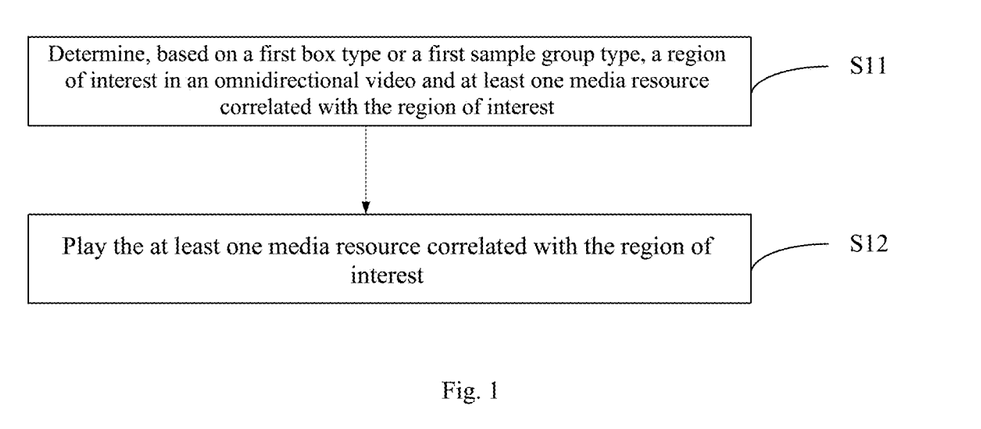
FIG. 1 is a flowchart of a media resource playing method provided by an embodiment of the present disclosure.

FIG. 1 is a flowchart of a media resource playing method provided by an embodiment of the present disclosure. The media resource playing method provided by this embodiment is mainly suitable for playing at least one media resource in a region of interest in a VR scenario. The media resource playing method is executed by a media resource playing apparatus, which can be implemented by hardware and/or software.

As shown in FIG. 1, the media resource playing method provided by this embodiment of the present disclosure mainly includes steps S11 and S12.

At S11, based on a first box type or a first sample group type, a region of interest in an omnidirectional video and at least one media resource correlated with the region of interest is determined.

At S12, the at least one media resource correlated with the region of interest is played.

In an example implementation, for a region of interest applicable to all video samples, determining, based on a first box type, a region of interest in an omnidirectional video and at least one media resource correlated with the region of interest includes: identifying a region of interest description box in a video sample entry or a restricted sample entry of omnidirectional video based on the first box type; and determining, based on elements in the region of interest description box, the region of interest in the omnidirectional video and the at least one media resource correlated with the region of interest.

In an example implementation, for a region of interest applicable to a video sample group, determining, based on a first sample group type, a region of interest in an omnidirectional video and at least one media resource correlated with the region of interest includes: identifying a region of interest sample group entry in an omnidirectional video track based on the first sample group type; and determining, based on elements in the region of interest sample group entry, the region of interest in the omnidirectional video and the at least one media resource correlated with the region of interest.

In an example implementation, playing the at least one media resource correlated with the region of interest includes: playing the at least one media resource correlated with the region of interest in a current viewport of a user, or playing the at least one media resource correlated with the region of interest in the region of interest.

In an example implementation, the region of interest is described by at least one of the following information: number of regions of interest; identifiers of regions of interest; spatial regions of region of interest; types of region of interest; or descriptions of region of interest.

In an example implementation, the types of region of interest includes at least one of the following information: a creator-recommended type; a picture-enhanced type; a real-time hotspot type; an orientation-guided type; or a multi-screen interaction type.

In an example implementation, the spatial regions of region of interest includes at least one of the following information: a center point of a sphere region; or an azimuth range and an elevation range in the sphere region, where the center point of the sphere region is determined by an azimuth of the center point, an elevation of the center point, and an inclination of the center point.

In an example implementation, the media resource includes at least one of: an audio, a video, an image, or a timed text.

Figure 2:
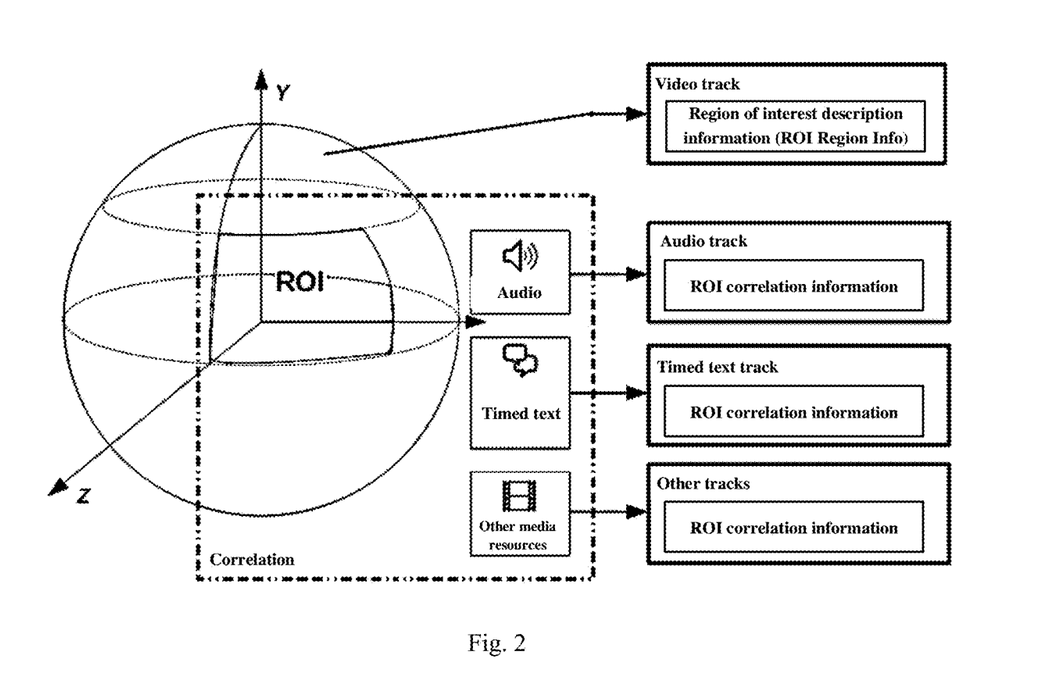
FIG. 2 is a schematic diagram of a region of interest in an omnidirectional video and at least one media resource correlated with the region of interest provided by an embodiment of the present disclosure.

FIG. 2 is a schematic diagram of a region of interest in an omnidirectional video and at least one media resource correlated with the region of interest provided by an embodiment of the present disclosure. Video data covers 360-degree spatial regions including a ROI. The video data and location information of the region of interest are described in a video track. The region of interest is correlated with the at least one media resource, such as audio, or a timed text. The correlation here is described in respective tracks of the media resources. The region of interest in a panoramic video includes a piece of spatial location information that changes with time, and the spatial location has a strong correlation with image content of the panoramic video. Therefore, in this embodiment, region of interest information is stored in a metadata area in the video media track as a part of video data information. In a scenario in which the region of interest changes with time, the following cases are common.

In the first case, a spatial location of the ROI remains unchanged in a process of playing the panoramic video.

In the second case, the spatial location of the ROI changes with the video playing and the passage of time. In an extreme case, different video media samples correspond to different spatial locations of the ROI.

In the third case, the spatial location of the ROI changes with the video playing and the passage of time, but it remains unchanged in some time periods.

In the fourth case, there are different types of ROIs at a same moment.

Figure 3:
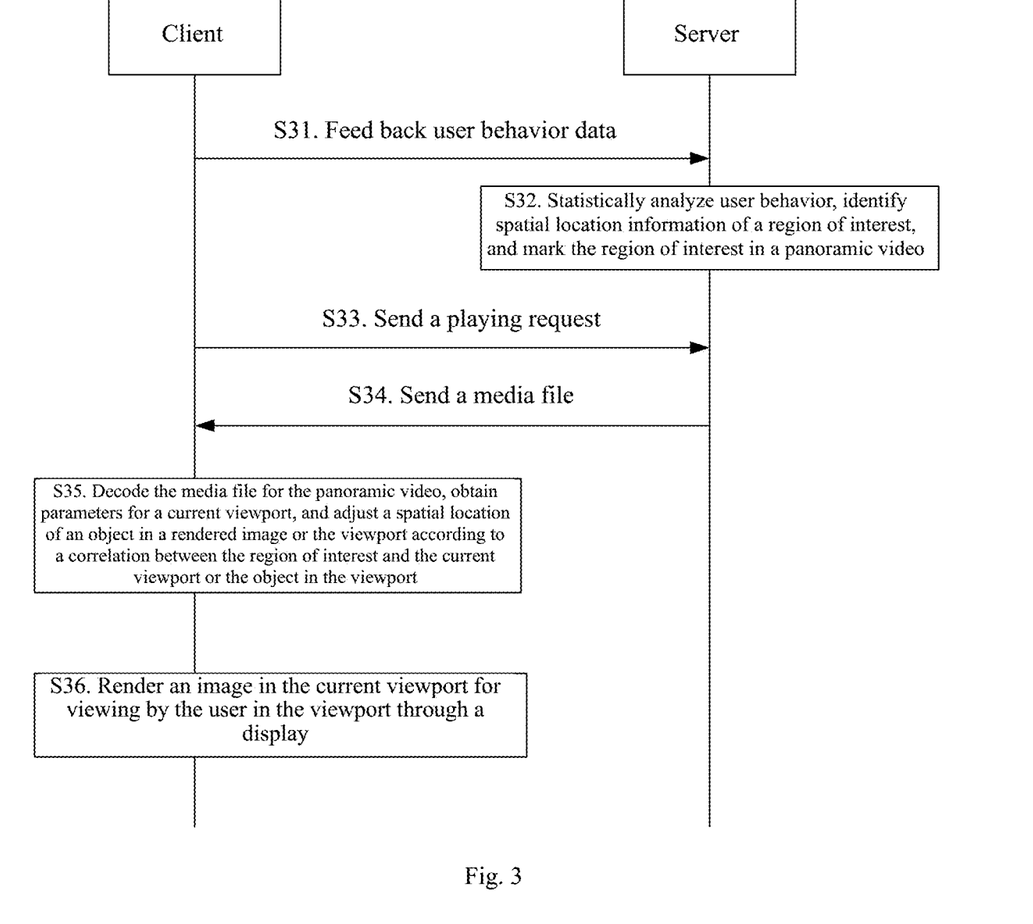
FIG. 3 is a flowchart of a method for combining a region of interest with a user's viewport provided by an embodiment of the present disclosure.

In an application example, an embodiment of the present disclosure provides a method for combining a region of interest in a panoramic video with a user's viewport, mainly applied to transmission between a server and a client, and decoding and rendering for the client. FIG. 3 is a flowchart of the method for combining the region of interest with the user's viewport provided by the embodiment of the present disclosure. As shown in FIG. 3, the method for combining the region of interest in the panoramic video with the user's viewport mainly includes the following steps.

At S31, the client feeds back user behavior data to the server.

At S32, the server statistically analyzes user's viewing behavior, identifies spatial location information of the region of interest, marks the region of interest in the panoramic video, adds region of interest description information in a video track based on MPEG-I Part 2 OMAF and ISOBMFF, and adds ROI correlation description information for media objects each having a specified relationship with ROI image content, such as subtitles, audio, and superimposed video.

At S33, the client initiates a playing request to the server.

At S34, the server sends a media file to the client based on the above playing request.

At S35, the client decodes the media file for the panoramic video, obtains parameters for a current viewport, and adjusts a spatial location of an object in a rendered image or the viewport according to a correlation between the region of interest and the current viewport or the object in the viewport.

At S36, the client renders an image in the current viewport for viewing by the user in the viewport through a display.

The region of interest can come from a variety of sources, which can be broadly classified into two categories as described below: In the first category, the region of interest is given in advance by a content producer. For example, a director-recommended perspective is provided for artistic guidance or an initial viewport is provided for on-demand content. In the second category, according to user behavior prediction or client-transmitted signaling, a location of the region of interest in the panoramic video is determined for adding related description information.

The adjustment of the spatial location in S35 may be determined according to at least one of the following information: an object type, or client behavior.

Application scenarios may exist in the following forms.

For the first form, when there is a correlation between audio and the region of interest, because sound naturally has a positioning characteristic, the client can combine stereo, surround sound and other technologies to indicate the location information of the region of interest to the user through orientation of the audio, thus guiding the user to capture highlights in time.

For the second form, when there is a correlation between a timed text and the region of interest, the client adjusts as needed a region where the timed text is displayed. The timed text can not only be used as a text prompt for narration and dialogue, but also be used to annotate some scenes in video images, which can effectively improve VR experience, especially for a hearing-impaired user.

For the third form, the user expects to focus on some particular regions while watching the whole image of the panoramic video. For example, when watching a sports event, the user wants to pay attention to a particular athlete as well as the whole stadium. In this case, the client can display the region of interest in the user's viewport in a form of "picture in picture" through video stitching.

The correlation relationship and the adjustment method provided in this embodiment of the present disclosure are only for illustration not limitation. A final rendering effect is determined jointly by the client and media data.

All data in ISOBMFF media files are stored in a box, and a type and a size of the data can be described in a header of the box. If one box supports containing, that is, one box contains another child box, the box is called a container box.

"Trak" represents a data track, and a child box of the track contains media data reference and description of the track. Trak can include a media box (mdia). A relationship between trak and mdia can be recorded as trak→mdia. Here, mdia may contain media data information, defined media types, and sample data, and describes sample information. The media data may include video, audio, subtitles and other types. As a container box, mdia may contain one media header box (mdhd), one handler reference box (hdlr), and one media information box (minf). A relationship among trak, mdia and minf can be recorded as trak→mdia→minf.

In this embodiment of the present disclosure, a sample table box (stbl) in minf is used to store information about the region of interest, which can meet the needs of describing the region of interest in various scenarios.

The media resource playing method provided by this embodiment of the present disclosure is mainly used in a panoramic video processing method, and can use ISOBMFF to describe the region of interest in immersive media video content, and then provide a correlation between the viewport and the region of interest, to enable the user to know information about distribution of the ROI in the panoramic video during independent control of a viewing direction.

In this embodiment of the present disclosure, after the region of interest is marked in the panoramic media file, a viewport or an object and a description of the related information the region of interest can be further added for the video image or other types of objects (such as subtitles, video stitching, and audio) in the user's viewport, so that the video image or the media object can be adjusted correspondingly in the current viewport, and the user can obtain the related information of the ROI region. Through the above correlation relationship, it can not only meet the user's need to independently control the viewport, but also provide ROI indications without affecting the user's authority for assisting the user's viewing process, thereby effectively improving the user's VR experience.

Figure 4:
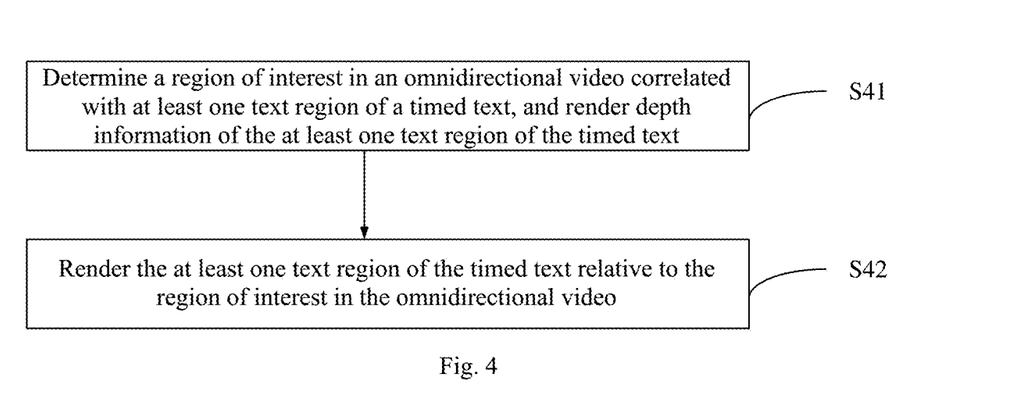
FIG. 4 is a flowchart of a timed text rendering method provided by an embodiment of the present disclosure.

FIG. 4 is a flowchart of a timed text rendering method provided by an embodiment of the present disclosure. The timed text rendering method provided by this embodiment is mainly suitable for rendering a text in a region of interest in a VR scenario. The timed text rendering method is executed by a timed text rendering apparatus, which can be implemented by hardware and/or software.

As shown in FIG. 4, the timed text rendering method provided by this embodiment of the present disclosure mainly includes steps S41 and S42:

At S41, a region of interest in an omnidirectional video correlated with at least one text region of a timed text is determined, and depth information of the at least one text region of the timed text is rendered.

At S42, the at least one text region of the timed text relative to the region of interest in the omnidirectional video is rendered.

In an example implementation, determining a region of interest in an omnidirectional video correlated with at least one text region of a timed text includes: for a region of interest applicable to all timed text samples, identifying a timed text configuration box in a timed text track sample entry based on a second box type; and determining, based on elements in the timed text configuration box, the region of interest in the omnidirectional video correlated with the at least one text region of the timed text.

In an example implementation, determining a region of interest in an omnidirectional video correlated with at least one text region of a timed text includes: for a region of interest applicable to a timed text sample group, identifying a timed text sample group entry in a timed text track based on the second sample group type; and determining, based on elements in the timed text sample group entry, the region of interest in the omnidirectional video correlated with the at least one text region of the timed text.

In an example implementation, rendering the at least one text region of the timed text relative to the region of interest in the omnidirectional video includes: constructing a three-dimensional plane relative to a unit sphere, where a sphere region location corresponding to the three-dimensional plane is determined according to the region of interest in the omnidirectional video, and a distance between the three-dimensional plane and a center of the unit sphere is determined according to depth information; and rendering the at least one text region of the timed text on the three-dimensional plane.

In an example implementation, the depth information is a depth value for rendering the at least one text region of the timed text in the region of interest in the omnidirectional video.

In an example implementation, the region of interest in the omnidirectional video is described by at least one of the following information: number of regions of interest; identifiers of regions of interest; spatial regions of region of interest; types of region of interest; or descriptions of region of interest.

In an example implementation, the types of region of interest includes at least one of the following information: a creator-recommended type; a picture-enhanced type; a real-time hotspot type; an orientation-guided type; or a multi-screen interaction type.

In an example implementation, the spatial region of the region of interest includes at least one of the following information: a center point of a sphere region; or an azimuth range and an elevation range in the sphere region, where the center point of the sphere region is determined by an azimuth of the center point, an elevation of the center point, and an inclination of the center point.

Figure 5:
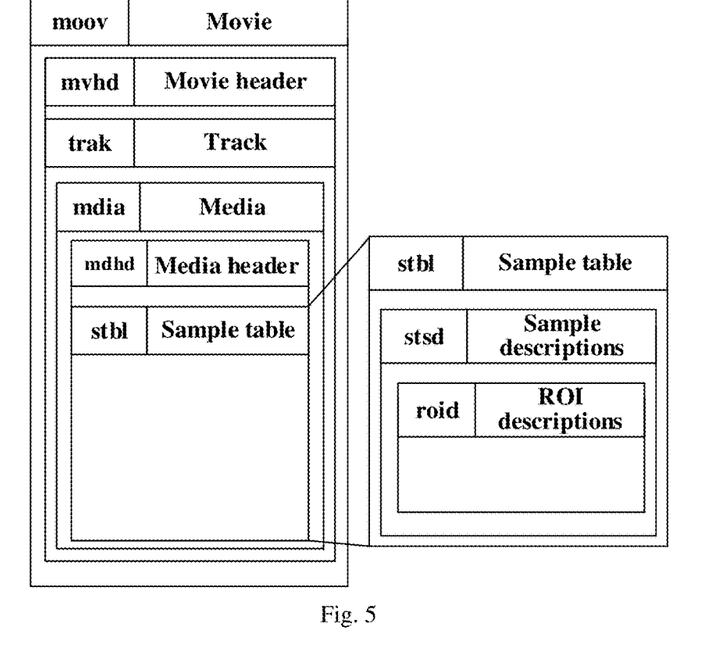
FIG. 5 is a schematic diagram of a box distribution in a panoramic video track provided by an embodiment of the present disclosure.

In an application example, an embodiment of the present disclosure provides a method for describing spatial location information of a ROI in a media file, when a location of the region of interest in a panoramic video remains unchanged throughout the process. FIG. 5 is a schematic diagram of a box distribution in a panoramic video track provided by an embodiment of the present disclosure.

In the scenario of this embodiment, the spatial location of the ROI can be considered as an inherent attribute of media video data. For this scenario, the location information of the ROI is described by Sample Entry in stbl box. As shown in FIG. 5, stbl is a container box, and a child box of stbl includes a sample description box (stsd), which is used to describe related decoder information such as initialization parameters required for decoding media data. A relationship among trak, mdia, minf, stbl and stsd can be recorded as trak→mdia→minf→stbl→stsd. stsd can contain multiple sample entries, one media data track can contain multiple pieces of description information, and a type of the sample entry for video data is fixed as a visual sample entry. However, for panoramic media data, description information such as spatial location information, a projection mode, and a splicing mode of video data cannot be analyzed by an ordinary decoder. Therefore, the above description information is described in a scheme information box.

In this embodiment, for ordinary video data, information about a region of interest is described in the Visual Sample Entry, and for a panoramic video, the information is described in the scheme information box. A region of interest description box (roid) is further included, which is used to describe a spatial location and changes thereof for a region of interest in a video data track, and is defined as follows.

Region Of Interest Description Box
Box Type:           'roid'
Container:          Visual Sample Entry or Scheme Information Box
Mandatory:          No
Quantity:           Zero or one
A syntax is as follows:
class Region Of Interest Description Box extends FullBox('roid',0,0) {
unsigned int(8) roi_count;
for (i=0;i<roi_count;i++) {
ROI RegionStruct( );
unsigned int(8) track_count;
for (i=0;i<track_count;i++) {
unsigned int(8) track_id;
}
}
}
aligned(8) ROIRegionStruct( ) {
unsigned int(8) roi_shape_type;
unsigned int(8) roi_id;
unsigned int(8) roi_type;
string roi_description;
SphereRegionStruct(1);
}

A syntax is defined as follows.

The roi_count represents the number of regions of interest; ROIRegionStruct( ) represents information about the region of interest, including the spatial location, identifiers of regions of interest, correlation information, and the like.

The track_count represents the number of media tracks correlated with the region of interest; and track_id represents a media track identifier correlated with the region of interest, and at least one media resource correlated with the region of interest can be determined by the track identifier.

A syntax of ROIRegionStruct( ) is defined as follows.

The roi_shape_type represents a shape type of a spatial region of a region of interest; roi_id represents an identifier of a region of interest and is unique in a current track; and roi_type represents a type of a region of interest.

Sources and types of the regions of interest are shown in Table 1.

TABLE 1

| Value | Description |
|---|---|
| 0 | Representing a creator-recommend type, which recommends a viewing direction for a user according to the creator's intention |
| 1 | Representing a picture-enhanced type, which provides close-ups of exciting regions, high-definition images, and the like |
| 2 | Representing a real-time hotspot type, which provides information of a region of greatest interest in a current video |
| 3 | Orientation guidance |
| 4 | Representing a multi-screen interaction type, which provides multi-directional video images at the same time |
| 5-255 | Customized |

For roi_description, an 8-bit Unicode Transformation Format (UTF-8) string ending with a null character provides a text description for the region of interest. SphereRegionStruct ( ) represents the spatial region of the region of interest. Relative to a global coordinate axis, a shape type of the region of interest is indicated by roi_shape_type, and an interpolate in SphereRegionStruct(1) should be equal to 0.

Figure 6:
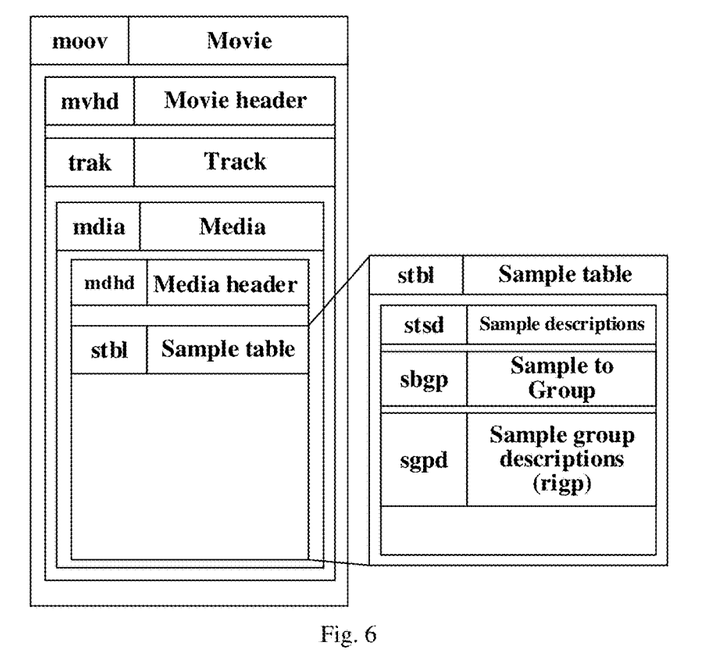
FIG. 6 is a schematic diagram of another box distribution in a panoramic video track provided by an embodiment of the present disclosure.

This embodiment describes a method for describing spatial location information of a ROI in a media file, when a location of the region of interest in a panoramic video changes with video playing and passage of time but remains unchanged for some time periods. FIG. 6 is a schematic diagram of another box distribution in a panoramic video track according to an embodiment of the present disclosure.

In a scenario of this embodiment, location information of the region of interest can be understood as a common attribute of some samples in the video track, and therefore, a Sample Group structure in ISOBMFF is used to describe spatial information of the region of interest. As shown in FIG. 6, a sample group is a mechanism for representing some sample attributes in a media track. The sample group consists of two structures, that is, a sample to group box (sbgp) and a Sample Group Description box (sgpd). When the region of interest remains unchanged for some time periods, that is, regions of interest corresponding to some samples in the video track are the same, the spatial location of the ROI at this case can be described by using the sample group.

The grouping_type is used to identify a type of a sample group, that is, a condition for forming the sample group, and to link the sample group to a group with the same type value in a group description of the sample group. For one media track, the same grouping_type appears at most once. In this embodiment, a spatial information group type of the region of interest is defined as "rigp", which classifies the samples in the video track into several groups according to different regions of interest, corresponding to the sgpd box.

Each sgpd box corresponds to one sbgp box, and the spatial location information of the region of interest is described in the sgpd box. The grouping_type is defined as "roig" as above. The sample group entries in the sgpd box are extended for the region of interest, that is, ROI Sample Group Entry.

---

A syntax is defined as follows.
class ROISampleGroupEntry( ) extends SampleGroupDescriptionEntry ('roig') {
unsigned int(8) ROI_count;
for (i=0;i<ROI_count;i++) {
ROIRegionStruct( );
unsigned int(8) track_count;
for (i=0;i<track_count;i++) {
unsigned int(8) track_id;
}
}
}
A syntax is defined as follows.

---

The roi_count represents the number of regions of interest; and ROIRegionStruct ( ) represents information about the region of interest, including the spatial location, identifiers of regions of interest, correlation information, and the like.

The track_count represents the number of media tracks correlated with the region of interest; and track_id represents a media track identifier correlated with the region of interest, and at least one media resource correlated with the region of interest can be determined by the track identifier. A syntax of ROIRegionStruct ( ) is as defined before, and will not be repeated in this embodiment.

In an application example, this embodiment describes a description method of a correlation relationship between media data and a spatial region in a panoramic media file when this correlation relationship exists and all samples only correspond to one spatial region, where the spatial region is defined by the region of interest in the video track.

There are many types of media correlated with the region of interest, such as audio, text, or partial video region, and a presentation effect of the media is related to an operation of a client. This embodiment takes the timed text as an example to describe one of the correlation ways. Timed text refers to VR subtitles. In this embodiment, a location of the timed text being rendered is not only related to two-dimensional region information defined in a timed text track, but also related to the region of interest in the video. For this scenario, a process of playing and rendering the VR subtitles is as follows.

1) A location of a video-shooting source camera is used as a center point, to construct a spherical spatial region for setting solid geometry for a virtual reality scenario.

2) For moment t, a panoramic player reads depth information of the timed text or a binocular disparity, a correlation with the region of interest, and the two-dimensional region information.

3) The panoramic player reads the spatial location information of the region of interest in a corresponding video track according to the correlation with the region of interest.

4) If a presentation manner of subtitles is constant displaying on a display screen, then according to the parameters in step 1 to step 3 and the binocular disparity value, presentation locations of the timed text on display screens corresponding to the left eye and the right eye are respectively calculated, and the timed text is rendered separately on the display screens corresponding to the left eye and the right eye.

5) If the presentation manner of the subtitles is fixed displaying in the region of interest, then a three-dimensional plane is constructed according to the parameters and depth values in step 1 to step 3, and the timed text is rendered on the three-dimensional plane.

In this embodiment, timed text spatial parameters and the correlation with the region of interest in panoramic media are described by using an Omaf Timed Text Config box (otcf). This embodiment provides two optional implementations, which correspond to two syntax structures respectively.

In the first optional implementation, a definition and a syntax of the timed text configuration box are as follows.

---

Box Type:     'otcf'
Container:    XMLSubtitleSampleEntry or WVTTSampleEntry
Mandatory:    Yes
Quantity:     One
class OmafTimedTextConfigBox extends FullBox('otcf', 0, 0) {
   unsigned int(1) relative_to_roi_flag;
   unsigned int(1) relative_disparity_flag;
   unsigned int(1) depth_included_flag;
unsigned int(1) roi_included_flag;
   bit(5) reserved = 0;
   unsigned int(8) region_count;
   for (i=0;i<region_count;i++) {
     string region_id;
     if (relative_disparity_flag)
          signed int(16) disparity_in_percent;
     else

```
            signed int(16) disparity_in_pixels;
    if (depth_included_flag)
            unsigned int(16) region_depth;
if(roi_included_flag){
unsigned int(8) roi_id;
unsigned int(8) track_id;
}
  }
}
```

The relative_to_roi_flag represents a rendering mode for the timed text, 1 indicates that the timed text always appears on the display screen, and 0 indicates that the timed text appears in the region of interest in space and is only visible when a user views the timed text in a direction corresponding to the region of interest.

TABLE 3

| Value | Description |
| --- | --- |
| 0 | The timed text always appears on the display screen |
| 1 | The timed text is presented in the region of interest |

The relative_disparity_flag represents a disparity unit, 0 represents a pixel, and 1 represents a percentage. The roi_included_flag indicates whether the region of interest is provided in otcf box, 0 indicates not provided, and 1 indicates provided. The disparity_in_percent/pixels represents a value of disparity, which can be negative. roi_id represents the region of interest correlated with the timed text, corresponding to the region of interest in the video track.

The track_id is optional, representing a video track identifier correlated with the timed text, and may not be provided when the timed text track is correlated with the video track through a Track Reference Box (tref).

In the second implementation, a definition and a syntax of the timed text configuration box are as follows.

```
Box Type:     'otcf'
Container:    XMLSubtitleSampleEntry or WVTTSampleEntry
Mandatory:    Yes
Quantity:     One
class TTConfigBox extends FullBox('otcf', 0, 0) {
unsigned int(1) relative_to_viewport_flag;
unsigned int(1) relative_disparity_flag;
unsigned int(1) depth_included_flag;
bit(5) reserved = 0;
unsigned int(8) num_regions;
for (i=0;i< num_regions; i++) {
string region_id;
if(relative_to_viewport_flag == 1) {
if (relative_disparity_flag)
signed int(16) disparity_in_percent;
else
signed int(16) disparity_in_pixels;
} else if(relative_to_viewport_flag == 0) {
SphereRegionStruct(0);
if (depth_included_flag)
unsigned int(16) region_depth;
} else if(relative_to_viewport_flag == 2) {
if (depth_included_flag)
unsigned int(16) region_depth;
unsigned int(8) roi_id;
unsigned int(8) track_id;
}
}
}
```

The relative_to_viewport_flag represents a render manner for the timed text. A value of 1 indicates that the timed text should always be displayed on the display screen. A value of 0 indicates that the timed text is rendered at a fixed spatial location on the sphere, that is, the text indication is visible only when the user views content in a direction corresponding to the rendered text indication. A value of 2 indicates that the timed text is rendered in the region of interest on the sphere, and the text indication is visible when the user views content in a direction corresponding to the region of interest.

The roi_id represents the region of interest correlated with the timed text, corresponding to the region of interest in the video track.

The track_id is optional, representing a video track identifier correlated with the timed text, and may not be provided when the timed text track is correlated with the video track through a Track Reference Box (tref).

In an application example, this embodiment describes the description method of the correlation relationship between media data and the spatial region in the panoramic media file when this correlation relationship exists and different samples correspond to different spatial regions.

This embodiment still uses the timed text as an example and provides descriptions by using the sample group structure. This embodiment provides two optional implementations: a spatial region corresponding to a timed text sample can be defined by the region of interest in the video track, or a spatial region can be specified, which corresponds to two syntax structures respectively.

In this embodiment, a process of playing and rendering the VR subtitles is basically the same as that of the above embodiment, but the correlation relationship is obtained according to the timed text sample group.

In the first implementation, a spatial information group type of the region of interest is defined as "rcgp", and the samples in the timed text track are classified into multiple groups according to different regions of interest correlated with the samples. Each sgpd box corresponds to one sbgp box, and types of regions of interest correlated with samples in the same group are described in the sgpd box. The grouping_type is defined as "rcgp" as above. The sample group entries in the sgpd box are extended for a region of interest correlation, that is, region of interest correlation sample group entry (ROICorrelationSampleGroupEntry).

```
A syntax is defined as follows.
class ROICorrelationSampleGroupEntry( )
extends SampleGroupDescriptionEntry ('rcgp') {
unsigned int(1) relative_disparity_flag;
unsigned int(1) depth_included_flag;
unsigned int(1) roi_included_flag;
if (relative_disparity_flag)
signed int(16) disparity_in_percent;
else
signed int(16) disparity_in_pixels;
if (depth_included_flag)
unsigned int(16) region_depth;
if(roi_included_flag){
unsigned int(8) roi_id;
unsigned int(8) track_id;
}
}
```

The relative_disparity_flag represents a disparity unit, 0 represents a pixel, and 1 represents a percentage. The roi_included_flag indicates whether the region of interest is provided in otcf box, 0 indicates not provided, and 1 indicates provided. The disparity_in_percent/pixels represents a value of disparity, which can be negative. The roi_id represents the region of interest correlated with the timed text, corresponding to the region of interest in the video track.

The track_id is optional, representing a video track identifier correlated with the timed text, and may not be provided when the timed text track is correlated with the video track through tref.

In the second implementation, a spatial information group type of the region of interest is defined as "otgp", and the samples in the timed text track are classified into multiple groups according to different spatial regions correlated with the samples. Each sgpd box corresponds to one sbgp box, and types of regions of interest correlated with samples in the same group are described in the sgpd box. The grouping_type is defined as "otgp" as above. The sample group entries in the sgpd box are extended for a region of interest correlation, that is, region of interest correlation sample group entry (OmafTimedTextConfigEntry).

```
A syntax is defined as follows.
class OmafTimedTextConfigEntry( ) extends
SampleGroupDescriptionEntry ('otgp') {
    unsigned int(1) relative_disparity_flag;
    unsigned int(1) depth_included_flag;
    if (relative_disparity_flag)
        signed int(16) disparity_in_percent;
    else
        signed int(16) disparity_in_pixels;
    if (depth_included_flag)
        unsigned int(16) region_depth;
    SphereRegionStruct(0);
}
```

The relative_disparity_flag represents a disparity unit, 0 represents a pixel, and 1 represents a percentage. The disparity_in_percent/pixels represents a value of disparity, which can be negative. SphereRegionStruct ( ) represents a location of a sphere, which, together with other information, is used to determine a placement and display location of the timed text in three-dimensional space.

Figure 7:
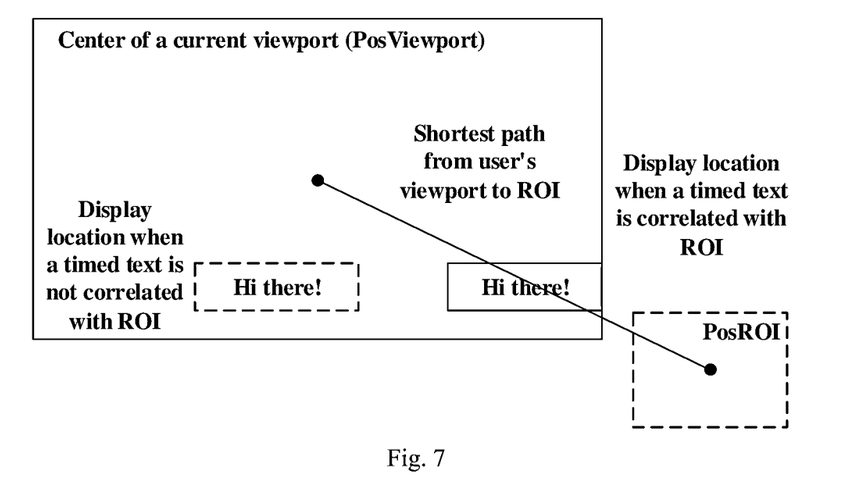
FIG. 7 is a schematic diagram of a subtitle data adjustment process provided by an embodiment of the present disclosure.

This embodiment takes a timed text as an example. FIG. 7 is a schematic diagram of a subtitle data adjustment process provided by an embodiment of the present disclosure. As shown in FIG. 7, a process of rendering the timed text is described when a type of region of interest exists in a panoramic video, including the following steps.

At step 1, a player obtains timed text data at moment (t), including media data such as a text and images, as well as information such as color, transparency, a size, and a spatial location.

At step 2, timed text configuration information in otcf box is read, where, in this embodiment, relative_to_viewport_flag is 2 and roi_included_flag is 1, the timed text changes with the region of interest, with only one type of region of interest provided here, and the type of region of interest roi_id is read.

At step 3: according to roi_id in otcf box, spatial location information (Posroi) represented by the same roi_id in a video track is obtained.

At step 4, the shortest path in space between a center point of a current viewport (PosViewport) and a center point of the region of interest (Posroi) is obtained.

At step 5, coordinates for a timed text display area is calculated. It is necessary to meet a requirement that a center point of the timed text display area is located on the shortest path in step 4, and the display area is not beyond a current viewport range.

At step 6, according to a disparity between left and right viewports, the coordinates for the timed text region in the left and right viewports are correspondingly adjusted.

At step 7, the timed text in the left and right viewports is separately rendered.

This embodiment is only one of applications in which media data in a panoramic media file is correlated with the region of interest, and the scheme of the present disclosure can be applied to any scenario in which a media object needs to be correlated with a region in a panoramic video image.

Figure 8:
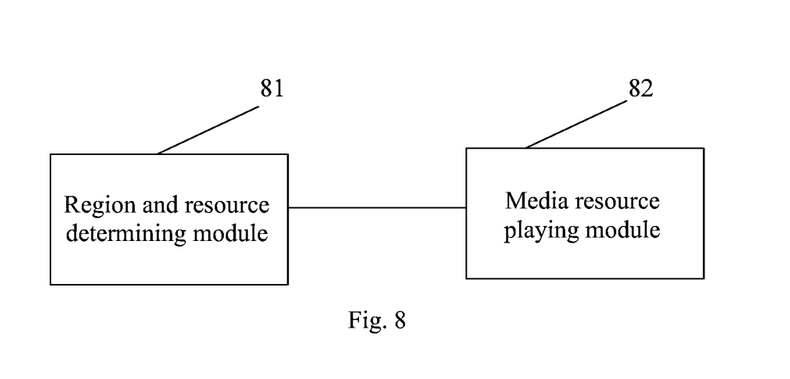
FIG. 8 is a schematic diagram of a media resource playing apparatus provided by an embodiment of the present disclosure.

FIG. 8 is a schematic diagram of a media resource playing apparatus provided by an embodiment of the present disclosure. The media resource playing apparatus provided by this embodiment is mainly suitable for playing at least one media resource in a region of interest in a VR scenario. The media resource playing apparatus can be implemented by hardware and/or software.

As shown in FIG. 8, the media resource playing apparatus provided by this embodiment of the present disclosure mainly includes a region and resource determining module 81 and a media resource playing module 82.

The region and resource determining module 81 is configured to determine, based on a first box type or a first sample group type, a region of interest in an omnidirectional video and at least one media resource correlated with the region of interest; and the media resource playing module 82 is configured to play the at least one media resource correlated with the region of interest.

In an example implementation, the region and resource determining module 81 is configured to: for a region of interest applicable to all video samples, determine the region of interest in the omnidirectional video and at least one media resource correlated with the region of interest based on the first box type.

The region and resource determining module 81 is configured to identify a region of interest description box in a video track sample entry based on the first box type, where the video track sample includes at least one of the following: a video track vision sample, or a restricted omnidirectional video track sample; and determine, based on elements in the region of interest description box, the region of interest in the omnidirectional video and the at least one media resource correlated with the region of interest.

In an example implementation, the region and resource determining module 81 is configured to: for a region of interest applicable to a video sample group, determine the region of interest in the omnidirectional video and at least one media resource correlated with the region of interest based on the first sample group type.

The region and resource determining module 81 is configured to identify a region of interest sample group entry in an omnidirectional video track based on the first sample group type; and determine, based on elements in the region of interest sample group entry, the region of interest in the omnidirectional video and the at least one media resource correlated with the region of interest.

In an example implementation, the media resource playing module 82 is configured to play the at least one media resource correlated with the region of interest in a current viewport of a user; or play the at least one media resource correlated with the region of interest in the region of interest.

In an example implementation, the region of interest is described by at least one of the following information: number of regions of interest; identifiers of regions of interest; spatial regions of region of interest; types of region of interest; or descriptions of region of interest.

In an example implementation, the types of region of interest includes at least one of the following information: a creator-recommended type; a picture-enhanced type; a real-time hotspot type; an orientation-guided type; or a multi-screen interaction type.

In an example implementation, the spatial regions of region of interest includes at least one of the following information: a center point of a sphere region; or an azimuth range and an elevation range in the sphere region, where the center point of the sphere region is determined by an azimuth of the center point, an elevation of the center point, and an inclination of the center point.

In an example implementation, the media resource includes at least one of: an audio, a video, an image, or a timed text.

Figure 9:
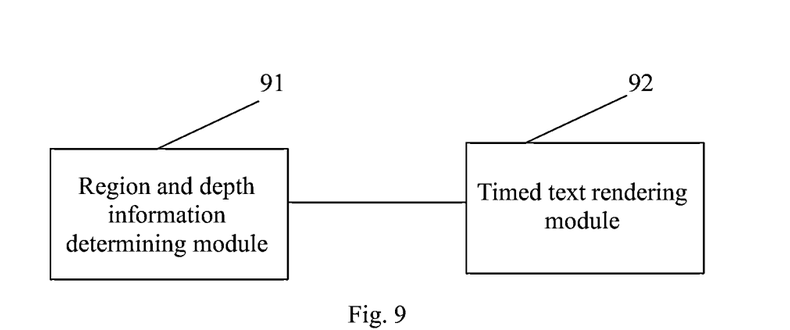
FIG. 9 is a schematic diagram of a timed text rendering apparatus provided by an embodiment of the present disclosure.

FIG. 9 is a schematic diagram of a timed text rendering apparatus provided by an embodiment of the present disclosure. The timed text rendering apparatus provided by this embodiment is mainly suitable for rendering a text in a region of interest in a VR scenario. The timed text rendering apparatus can be implemented by hardware and/or software.

As shown in FIG. 9, the timed text rendering apparatus provided by this embodiment of the present disclosure mainly includes a region and depth information determining module 91 and a timed text rendering module 92.

The region and depth information determining module 91 is configured to determine a region of interest in an omnidirectional video correlated with at least one text region of a timed text, and render depth information of the at least one text region of the timed text; and the timed text rendering module 92 is configured to render the at least one text region of the timed text relative to the region of interest in the omnidirectional video.

In an example implementation, the region and depth information determining module 91 is configured to: for a region of interest applicable to all timed text samples, identify a timed text configuration box in a timed text track sample entry based on a second box type; and determine, based on elements in the timed text configuration box, the region of interest in the omnidirectional video correlated with the at least one text region of the timed text.

In an example implementation, the region and depth information determining module 91 is configured to: for a region of interest applicable to a timed text sample group, identify a timed text sample group entry in a timed text track based on the second sample group type; and determine, based on elements in the timed text sample group entry, the region of interest in the omnidirectional video correlated with the at least one text region of the timed text.

In an example implementation, the timed text rendering module 92 is configured to construct a three-dimensional plane relative to a unit sphere, where a sphere region location corresponding to the three-dimensional plane is determined according to the region of interest in the omnidirectional video, and a distance between the three-dimensional plane and a center of the unit sphere is determined according to depth information; and render the at least one text region of the timed text on the three-dimensional plane.

In an example implementation, the depth information is a depth value for rendering the at least one text region of the timed text in the region of interest in the omnidirectional video.

In an example implementation, the region of interest in the omnidirectional video is described by at least one of the following information: number of regions of interest; identifiers of regions of interest; coordinates of spatial regions of region of interest; types of region of interest; or descriptions of region of interest.

In an example implementation, the types of region of interest includes at least one of the following information: a creator-recommended type; a picture-enhanced type; a real-time hotspot type; an orientation-guided type; or a multi-screen interaction type.

In an example implementation, the spatial regions of region of interest includes at least one of the following information: a center point of a sphere region; or an azimuth range and an elevation range in the sphere region, where the center point of the sphere region is determined by an azimuth of the center point, an elevation of the center point, and an inclination of the center point.

Figure 10:
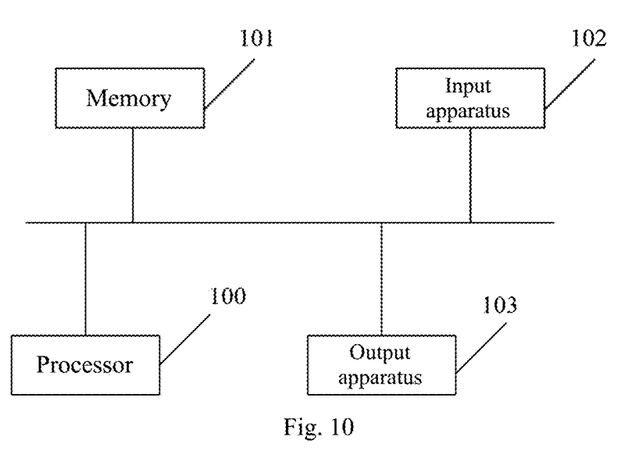
FIG. 10 is a schematic diagram of an electronic device provided by an embodiment of the present disclosure.

On the basis of the above embodiments, the embodiments of the present disclosure further provide an electronic device. FIG. 10 is a schematic diagram of an electronic device provided by an embodiment of the present disclosure. As shown in FIG. 10, the electronic device includes a processor 100, a memory 101, an input apparatus 102, and an output apparatus 103. The number of processors 100 in the electronic device can be one or more, and one processor 100 is shown as an example in FIG. 10. The processor 100, the memory 101, the input apparatus 102, and the output apparatus 103 in the electronic device can be connected through a bus or other manners, and the connection through the bus is taken as an example in FIG. 10.

The memory 101, as a non-transitory computer-readable storage medium, can be used to store software programs, computer-executable programs and modules, such as program instructions/modules corresponding to the media resource playing method in the embodiment of the present disclosure (for example, the region and resource determining module 81 and the media resource playing module 82 in the media resource playing apparatus); or program instructions/modules corresponding to the timed text rendering method in the embodiment of the present disclosure (for example, the region and depth information determining module 91 and the timed text rendering module 92 in the timed text rendering apparatus).

The processor 100 runs software programs, instructions and modules stored in the memory 101, to execute various functional applications of the electronic device and implement data processing, that is, implement any of the methods provided in the embodiments of the present disclosure.

The memory 101 may mainly include a program storage area and a data storage area, where the program storage area may store an operating system and application program(s) required by at least one function; and the storage data area may store data created according to the use of a terminal device, etc. In addition, the memory 101 may include a high-speed random access memory and a non-volatile memory, for example, at least one magnetic disk storage device, a flash memory device, or another non-volatile solid-state storage device. In some examples, the memory 101 may further include memories remotely located with respect to the processor 100, and these remote memories may be connected to electronic devices via a network. Examples of the above-mentioned network include the Internet, an intranet, a local area network, a mobile communication network, and a combination thereof.

The input apparatus 102 may be configured to receive an input numerical digit or character information and generate a key signal input related to user settings and function control of the electronic device. The output apparatus 103 may include a display device such as a display screen.

On the basis of the above embodiments, a further embodiment of the present disclosure provides a non-transitory computer-readable storage medium including computer-executable instructions, where the computer-executable instructions, when executed by a computer processor, are configured to perform any of the methods provided in the embodiments of the present disclosure.

For example, when the media resource playing method provided in the embodiment of the present disclosure is executed, the method includes: determining, based on a first box type or a first sample group type, a region of interest in an omnidirectional video and at least one media resource correlated with the region of interest; and playing the at least one media resource correlated with the region of interest.

For example, when the timed text rendering method provided in the embodiment of the present disclosure is executed, the method includes: determining a region of interest in an omnidirectional video correlated with at least one text region of a timed text, and rendering depth information of the at least one text region of the timed text; and rendering the at least one text region of the timed text relative to the region of interest in the omnidirectional video.

This embodiment of the present disclosure provides a non-transitory computer-readable storage medium including computer-executable instructions. In addition to performing the foregoing method operations, the computer-executable instructions can also be used to perform related operations of any method provided in any embodiment of the present disclosure.

Through the description of the above embodiments, those having ordinary skill in the art can understand that the present disclosure may be implemented by means of software and general-purpose hardware, and of course may alternatively be implemented by hardware. Based on this understanding, the technical schemes of the present disclosure may be embodied in the form of software products, which may be stored in a computer-readable storage medium (such as a floppy disk, read-only memory (ROM), random access memory (RAM), flash, hard disk and optical disk) and include instructions to cause a computer device (such as a personal computer, a server, or a network device) to perform the methods of the embodiments of the present disclosure.

In the embodiments of the media resource playing apparatus and the timed text rendering apparatus described above, included units and modules are only divided according to functional logic, but not limited to the above division, provided that the corresponding functions can be realized. In addition, names of the functional units are only for the convenience of differentiation, and are not intended to limit the protection scope of the present disclosure.

The above-described embodiments are only example embodiments of the present disclosure, and are not intended to limit the scope of protection of the present disclosure.

Those having ordinary skill in the art should understand that the term "user terminal" covers any suitable type of wireless user equipment, such as mobile phones, portable data processing equipment, portable web browsers or vehicle-mounted mobile stations.

Generally speaking, various embodiments of the present disclosure can be implemented in hardware or dedicated circuits, software, logic or any combination thereof. For example, some aspects can be implemented in hardware, while other aspects can be implemented in firmware or software that can be executed by a controller, a microprocessor or another computing device. However, the present disclosure is not limited thereto.

Embodiments of the present disclosure can be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example but not limited to, a read-only memory, a random-access memory, optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A media resource playing method, comprising:
   determining, based on a first box type or a first sample group type, a region of interest in an omnidirectional video and at least one media resource correlated with the region of interest; and
   playing the at least one media resource correlated with the region of interest;
   wherein determining, based on a first box type, a region of interest in an omnidirectional video and at least one media resource correlated with the region of interest comprises:
   identifying a region of interest description box in a video sample entry or a restricted sample entry of omnidirectional video based on the first box type; and
   determining, based on elements in the region of interest description box, the region of interest in the omnidirectional video and the at least one media resource correlated with the region of interest;
   wherein determining, based on a first sample group type, a region of interest in an omnidirectional video and at least one media resource correlated with the region of interest comprises:
   identifying a region of interest sample group entry in an omnidirectional video track based on the first sample group type; and
   determining, based on elements in the region of interest sample group entry, the region of interest in the omnidirectional video and the at least one media resource correlated with the region of interest.

2. The method of claim 1, wherein playing the at least one media resource correlated with the region of interest comprises:
   playing the at least one media resource correlated with the region of interest in a current viewport; or
   playing the at least one media resource correlated with the region of interest in the region of interest.

3. The method of claim 1, wherein the region of interest is described by at least one of the following information:
number of regions of interest; identifiers of regions of interest; spatial regions of region of interest; types of region of interest; or descriptions of region of interest.

4. The method of claim 3, wherein the types of region of interest comprises at least one of the following information:
a creator-recommended type; a picture-enhanced type; a real-time hotspot type; an orientation-guided type; or a multi-screen interaction type.

5. The method of claim 3, wherein the spatial regions of region of interest comprises at least one of the following information:
a center point of a sphere region; or
an azimuth range and an elevation range in the sphere region,
wherein the center point of the sphere region is determined by an azimuth of the center point, an elevation of the center point, and an inclination of the center point.

6. The method of claim 1, wherein the media resource comprises at least one of the following:
an audio, a video, an image, or a timed text.

7. A timed text rendering method, comprising:
determining a region of interest in an omnidirectional video correlated with at least one text region of a timed text, and rendering depth information of the at least one text region of the timed text; and
rendering the at least one text region of the timed text relative to the region of interest in the omnidirectional video;
wherein determining a region of interest in an omnidirectional video correlated with at least one text region of a timed text comprises:
identifying a timed text configuration box in a timed text track sample entry based on a second box type; and
determining, based on elements in the timed text configuration box, the region of interest in the omnidirectional video correlated with the at least one text region of the timed text; or
wherein determining a region of interest in an omnidirectional video correlated with at least one text region of a timed text comprises:
identifying a timed text sample group entry in a timed text track based on a second sample group type; and
determining, based on elements in the timed text sample group entry, the region of interest in the omnidirectional video correlated with the at least one text region of the timed text.

8. The method of claim 7, wherein rendering the at least one text region of the timed text relative to the region of interest in the omnidirectional video comprises:
constructing a three-dimensional plane relative to a unit sphere, wherein a sphere region location corresponding to the three-dimensional plane is determined according to the region of interest in the omnidirectional video, and a distance between the three-dimensional plane and a center of the unit sphere is determined according to the depth information; and
rendering the at least one text region of the timed text on the three-dimensional plane.

9. The method of claim 7, wherein the region of interest in the omnidirectional video is described by at least one of the following information:
number of regions of interest; identifiers of regions of interest; spatial regions of region of interest; types of region of interest; or descriptions of region of interest.

10. The method of claim 9, wherein the types of region of interest comprises at least one of the following information:
a creator-recommended type; a picture-enhanced type; a real-time hotspot type; an orientation-guided type; or a multi-screen interaction type.

11. The method of claim 9, wherein the spatial regions of region of interest comprises at least one of the following information:
a center point of a sphere region; or
an azimuth range and an elevation range in the sphere region,
wherein the center point of the sphere region is determined by an azimuth of the center point, an elevation of the center point, and an inclination of the center point.

12. A device, comprising:
at least one processor;
a memory configured to store at least one program, wherein
the at least one program, when executed by the at least one processor, causes the at least one processor to implement a media resource playing method comprising:
determining, based on a first box type or a first sample group type, a region of interest in an omnidirectional video and at least one media resource correlated with the region of interest; and
playing the at least one media resource correlated with the region of interest;
wherein determining, based on a first box type, a region of interest in an omnidirectional video and at least one media resource correlated with the region of interest comprises:
identifying a region of interest description box in a video sample entry or a restricted sample entry of omnidirectional video based on the first box type; and
determining, based on elements in the region of interest description box, the region of interest in the omnidirectional video and the at least one media resource correlated with the region of interest;
wherein determining, based on a first sample group type, a region of interest in an omnidirectional video and at least one media resource correlated with the region of interest comprises:
identifying a region of interest sample group entry in an omnidirectional video track based on the first sample group type; and
determining, based on elements in the region of interest sample group entry, the region of interest in the omnidirectional video and the at least one media resource correlated with the region of interest.

13. A non-transitory computer-readable storage medium storing a computer program which, when executed by a processor, causes the processor to implement the method of claim 1.

14. A non-transitory computer-readable storage medium storing a computer program which, when executed by a processor, causes the processor to implement the method of claim 9.

* * * * *